Nov. 5, 1957 R. W. RICHMOND 2,812,224
SEALED UNIVERSAL BEARING MOUNTING
Filed Feb. 15, 1955 2 Sheets-Sheet 1
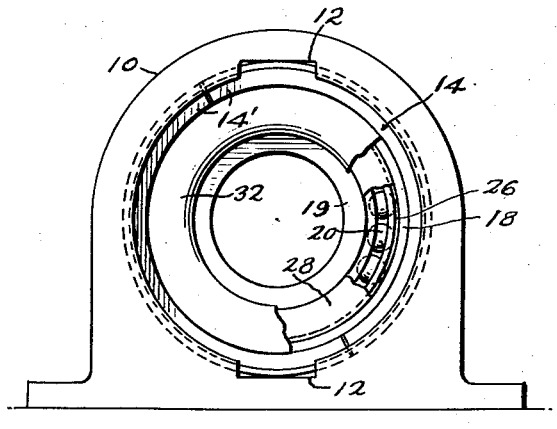
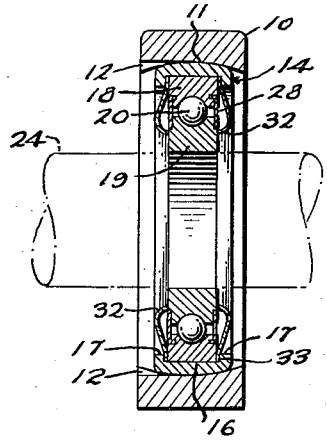
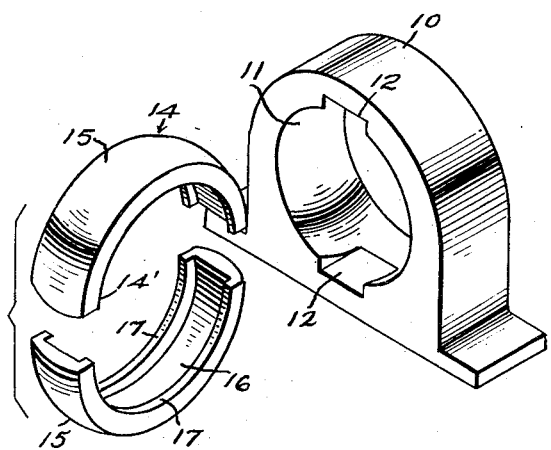
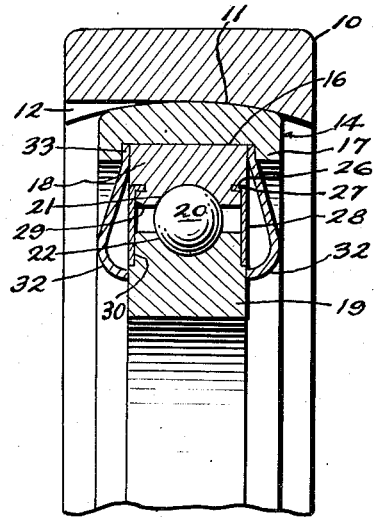
INVENTOR
RALPH W. RICHMOND
BY *John F. Phillips*
ATTORNEY Nov. 5, 1957
R. W. RICHMOND
2,812,224
SEALED UNIVERSAL BEARING MOUNTING
Filed Feb. 15, 1955
2 Sheets-Sheet 2
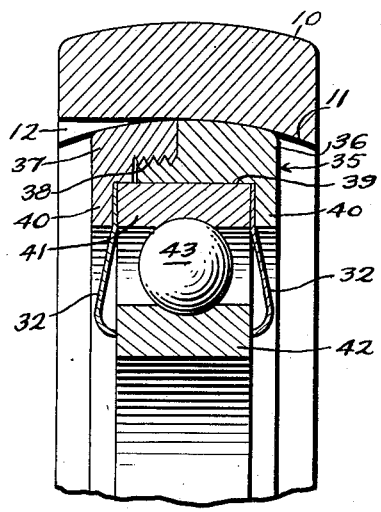
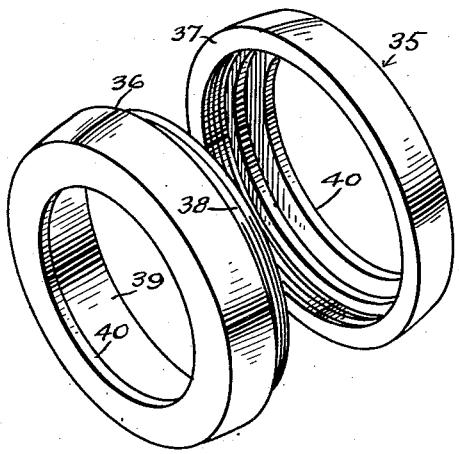
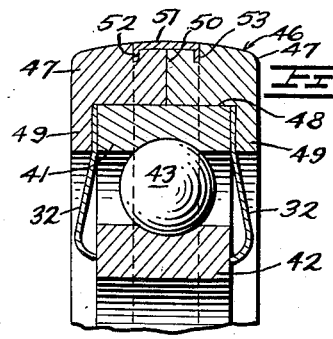
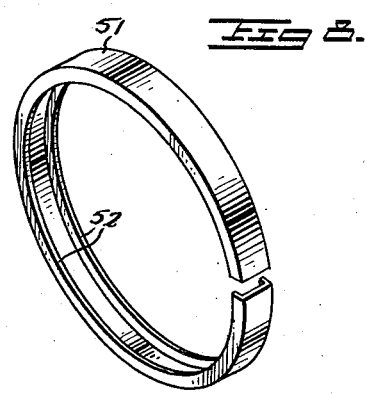
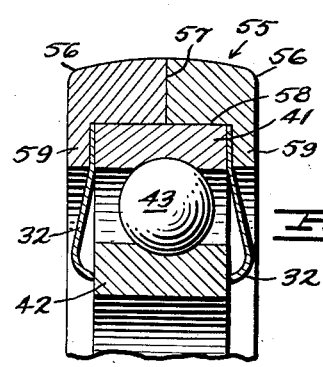
INVENTOR
RALPH W. RICHMOND
BY John F. Phillips
ATTORNEY

United States Patent Office 2,812,224
Patented Nov. 5, 1957

2,812,224

SEALED UNIVERSAL BEARING MOUNTING

Ralph W. Richmond, Hermiston, Oreg.

Application February 15, 1955, Serial No. 488,281

5 Claims. (Cl. 308—187.1)

This invention relates to a sealed universal bearing mounting and is a continuation-in-part of my copending application for Rod Weeder, Serial No. 222,085, filed April 20, 1951 now Patent Number 2,725,006.

In my copending application referred to above, I have disclosed and claimed a novel rod weeder of the type wherein rods are rotatably driven and travel just below the surface of the earth to uproot weeds. The weeder rods of the copending application are adapted to flex and are supported in a novel type of universal bearing which forms a part of the subject matter of the present application. While the bearing referred to has been found highly efficient for supporting weeder rods, it will become apparent that it is very effective for use in supporting any rotatable element, such as a shaft, for universal movement within substantial limits of angularity changes in the axis of the rotatable element.

An important object of the present invention is to provide a novel type of bearing mounting which is highly simplified in construction and easily assembled, and wherein the shaft or other rotatable element supported by the bearing is adapted to change its axial position during rotation.

A further object is to provide such a bearing mounting wherein anti-friction elements are employed in the bearing itself and which elements are effectively sealed against the entrance of dirt or other foreign material into the bearing.

A further object is to provide such a bearing structure wherein the sealing means with equal effectiveness prevents the escape of lubricant from the bearing, thus rendering it unnecessary to lubricate the bearing except at rare intervals.

A further object is to provide a bearing structure of the character referred to wherein the bearing itself is provided with inner and outer races between which are arranged anti-friction elements which retain the races in position with respect to each other against axial misalinement, and to provide in conjunction with the races a sealing element carried by one race and engaging the other to assist in sealing the space between the races against the entrance of dirt or other foreign material and against the escape of lubricant from the bearing.

A further object is to provide such a bearing structure wherein the outer bearing race is mounted in a cage of novel structure and cooperative relationship with the other parts to serve as a support and holding means in conjunction with the outer race for maintaining in position sealing means of a resilient nature engaging the inner race to seal the anti-friction elements from the entrance of dirt or other foreign material.

A further object is to provide such a bearing structure which facilitates the use of two sealing devices for each side of the bearing, thus increasing the assurance against entrance of foreign material into the bearing and double-sealing the bearing against the loss of lubricant therefrom.

A further object is to provide a novel cooperative relationship between the bearing itself and the cage and between the cage and the pillow block or other support whereby the entire structure within the pillow block forms a bearing unit which is adapted to rock within the pillow block to accommodate differences in the angular relationship between the pillow block and the rotatable member supported by the bearing.

A further object is to provide a novel arrangement of parts for greatly facilitating the insertion of the cage within the pillow block for universal mounting therein without the use of retaining means for holding the cage in the pillow block.

Other objects and advantages of the invention will become apparent during the course of the following description.

In the drawings I have shown several embodiments of the inveniton. In this showing:

Figure 1 is a side elevation of a preferred form of bearing structure, parts being broken away;

Figure 2 is a sectional view through the same, taken axially thereof;

Figure 3 is an enlarged fragmentary sectional view of the upper portion of the structure shown in Figure 2;

Figure 4 is a detail perspective view of the pillow block and bearing cage, the parts being shown separated;

Figure 5 is a detail sectional view similar to Figure 3, showing a modified form of the invention;

Figure 6 is a detail perspective view of the separable cage of Figure 5;

Figure 7 is a view similar to Figure 3, showing a further modified form of the invention;

Figure 8 is a detail perspective view of a snap ring employed in connection with the separable cage structure of Figure 7; and Figure 9 is a view similar to Figure 3, showing a further modified form of cage structure.

Referring to Figures 1–4, inclusive, the numeral 10 designates a pillow block or any other suitable type of bearing support formed to accommodate the other elements of the present invention. The housing or the pillow block 10, as shown in Figures 3 and 4, is provided with an internal surface 11 formed as a section of a sphere. At diametrically opposite points, the pillow block 10 is slotted as at 12 for a purpose to be described. The remote faces of the two grooves 12 are spaced apart a distance at least equal to the diameter of the sphere defined by the surface 11.

Within the pillow block 10 is arranged a cage indicated as a whole by the numeral 14. This cage is formed of a pair of complementary sections 14' which, when assembled as shown in Figure 1, present an outer surface 15 which is a section of a sphere corresponding in radius to the spherical surface 11 to be arranged therein. The width of the slots 12 is at least equal to the thickness of the cage 14 for the insertion of the latter therethrough when the parts of the cage 14 are brought into complementary engagement with each other in the positions of the sections 14' shown in Figure 4.

The cage 14 is provided with an internal cylindrical groove 16 extending between opposite flanges 17 which, of course, will be complementary when the cage sections 14' are assembled. Within the groove 16 is arranged an outer bearing race 18 of a width less than the width of the groove 16 for a purpose which will become apparent. The outer race 18 is associated with an inner bearing race 19 and between the two races are arranged anti-friction bearings 20, shown in the present instance as being bearing balls. The anti-friction elements operate in annular grooves 21 and 22 formed in the respective races 18 and 19. These grooves obviously are engaged by the anti-friction elements which not only reduce friction between the ball races but also prevent axial misalinement of the races, these elements always maintaining the relationship shown in Figures 2 and 3. The inner race 19 is adapted to support a rotatable element of any type such as a shaft, shaft coupling or the like, the rotatable element being shown in broken lines in Figure 2 and indicated as a shaft designated by the numeral 24.

Referring to Figure 3, the outer race 18 is provided on opposite faces with annular grooves 26 receiving respectively the inturned lips 27 of steel or other stamped seals 28. The seals 28 are recessed into the faces of the races 18 and 19 as at 29 and 30 respectively. The flanges 27 of the seals have a press fit with the recesses 26 to be tightly retained in position.

Resilient stamped steel or other metallic seals 32 bridge across the races 18 and 19. The radially outer extremities of the seals 32 are in the form of flanges 33 arranged between opposite faces of the outer race 18 and the inner faces of the flanges 17. The seals 32, as stated, are resilient and they diverge from each other and from the bearing races radially inwardly and then curve inwardly into radially inner edge extremities which engage the inner race 19. The seals 32 thus effectively prevent the entrance of foreign material into the interiors of the seals 32.

In Figures 5 and 6 a modified form of the invention is employed in which the pillow block, its recesses 11 and slots 12 are identical with the form of the invention previously described. In this modification of the invention, a cage indicated as a whole by the numeral 35 is employed. This cage, instead of being formed of diametrically separated sections as is true of the cage 14, is formed of longitudinally separable sections 36 and 37 threaded together as at 38. The cage 35 likewise is provided with an annular groove 39 at opposite sides of which are radially inwardly extending flanges 40 receiving an outer ball race 41 similar to the ball race 18 except that in this case the seals 28 are omitted. The outer race 41 is associated with an inner race 42 and between these races are arranged anti-friction elements 43, again shown as being bearing balls. The modified form of the invention referred to includes seals 32 which may be identical with those previously described and supported in position in the same manner.

The form of the invention in Figures 7 and 8 is identical with that shown in Figures 5 and 6 except that a different cage, indicated as a whole by the numeral 46, is employed. This cage is formed of separable sections 47, identical with each other and cooperating to form an internal annular groove 48 identical with the groove 39. Groove 48 has internal flanges 49 at opposite sides thereof and the groove 48 receives bearing and sealing means identical with the corresponding means in Figure 5 and indicated by the same numerals. The cage 46 has the separable sections thereof in abutting relationship as at 50. These cage sections are maintained in position by a snap ring 51 provided at its ends with inturned flanges 52 received in annular grooves 53 formed in the sections 47. The outer surface of the snap ring 51 may be a section of a sphere corresponding to the outer surface of the cage 46, or it may be flat so long as no portion thereof projects beyond the spherical cage surface.

In Figure 9 the bearing and sealing means is the same as in Figures 5 and 7, and the parts are indicated by the same reference characters. In Figure 9, a cage 55 is employed, formed of separable sections 56 divided in a plane transverse to the axis of the bearing structure and having the inner faces thereof in abutting relationship as at 57. The cage 55 is provided with an interior groove 58 extending between opposite flanges 59 in which the bearing and sealing structure is arranged. The cage 55 has its elements so formed that the surface of the recess portion 58 of each member 56 has a press fit with the outer bearing race 41 to retain the members of the cage in proper position.

*Operation*

Except for their association with other elements of the apparatus, the bearing races 18 and 19 and their anti-friction elements 20 may be conventional, and it will be apparent that these elements are assembled with respect to each other in accordance with conventional practice. The assembled ball races and anti-friction elements have applied thereto the seals 28, the flanges 27 of which have press fit with the annular grooves 26, thus being effectively retained in position. The seals 28 are obviously sealed relative to the outer race 18 by the flanges 27. The radially inner portion of each seal 28 has a sliding fit with the associated recess 30, whereby the inner race 19 is rotatable relative to the seals 28 and the space between the bearing races is thus sealed against the entrance of foreign material. In assembling the inner elements of the structure relative to the cage 14, the seals 32 are arranged in position relative to the bearing races, whereupon the cage members 15 are assembled by being moved radially inwardly toward each other around the inner bearing elements. The seal flanges 33 fit tightly against the outer race 19 and against the inner surfaces of the flanges 17, thus effectively preventing the entrance of foreign material around the radially outer ends of the seals 32. The seals 32 are resilient and have their radially inner extremities slidably engaging opposite faces of the inner race 19, thus effectively preventing foreign material from entering the spaces within the seals 32.

In assembling the elements in the foregoing manner, a lubricant is placed in the space between the inner and outer bearing races, and if desired, within the seals 32. The latter lubricant will maintain a lower coefficient of friction between the seals 32 and the bearing race 19 and will eliminate any space within the seals 32 in which any of the lubricant around the anti-friction elements could leak if there should be a slight leakage around the seals 28.

The elements as assembled above constitute a bearing unit complete in itself and capable of being handled as a unit. This unit is inserted in position by placing it to one side of the pillow block 10 with its axis perpendicular to the axis of the block 10, then moving the unit through the slots 12. When this inserting movement of the bearing unit takes place to its limit, the center of the sphere defined by the outer surface 15 will coincide with the center of the sphere of the recess 11. The cage 14 and the elements therein are then rocked through 90° to arrange the parts as shown in Figures 1 and 2. The shaft 24 or other rotatable element is then inserted in the inner race 19 and keyed or otherwise secured thereto in accordance with conventional practice.

It will be apparent that the rotatable member 24 will be supported for anti-friction rotation by the bearing elements 18, 19 and 20, this operation in itself being conventional. It will be noted, however, that in addition to the axial rotational movement, the rotatable member 24 is adapted to partake of rocking movement out of axial alinement with the pillow block 10. This movement is permitted by virtue of engagement of the spherical faces 11 and 15 and a very substantial angular movement of the member 24 is allowed to take place. It is impossible for the cage 14 to become displaced from the pillow block 10 except by turning it 90° from its position shown in Figures 2 and 3, which movement is rendered impossible by the rotatable member 24 and which movement the member 24 would never be called upon to take.

The forms of the invention shown in Figures 5-9, inclusive, are identical with the form previously described so far as concerns the inserting of the parts into the pillow block and the accommodation of the structure to axial misalinements of the rotatable member 24. The modified forms of the invention may be used as illustrated with the single seal 32, or if desired, the seal 28 may be employed with either modified form of the invention.

As previously stated, the cage sections 14' are brought together by being moved radially inwardly. In the modified forms of the invention, the cage is divided for separation of the parts longitudinally of the axis of the structure. The cage members 36 and 37 in Figure 5 are threaded together and tightly clamped against the outer flanges of the seals 32. The cage members 36 and 37 of course are preferably provided with recesses in the faces thereof for engagement with conventional spanner wrenches or the like, this being in itself conventional practice.

The parts of the cage 46 in Figure 7 are assembled by sliding them together from opposite sides of the assembled inner structure, and the snap ring 51 fixes the cage sections 47 in proper position with respect to each other.

The form of the invention in Figure 9 is substantially identical with the form shown in Figure 7 except for the elimination of the snap ring and its annular recesses in the cage members 47. In Figure 9, the cage members 56 have a press fit with the outer bearing cage 41, the parts preferably being assembled in a suitable press and the fitting of the parts preventing separation thereof in operation.

From the foregoing it will be apparent that the present construction provides a novel universal mounting for anti-friction bearings and also provides means for sealing the anti-friction elements from contact with any foreign substance, thus rendering the structure particularly useful for farm implements or with any other apparatus which is operated in the presence of dust and dirt. It also will be apparent that the parts are extremely simple and easily assembled without the use of fastening elements, including the placing of the bearing cages of various forms of the invention within their associated pillow blocks.

It is to be understood that the forms of the invention shown and described are to be taken as preferred examples of the same and that such changes in the shape, size and arrangement of the parts may be made as do not depart from the spirit of the invention or the scope of the appended claims.

I claim:

1. A bearing structure comprising a bearing housing having a spherical inner face, a cage within said housing having a spherical outer face engaging the spherical inner face of said housing to rock therein, said housing being provided with diametrically opposite slots extending transversely thereof and having their remote faces spaced apart a distance at least equal to the diameter of said cage, said slots being of a width at least equal to the width of said cage whereby the latter, with its axis perpendicular to the axis of said housing, is adapted to be inserted thereinto, said cage being formed of separable sections and having an internal annular groove, an antifriction bearing comprising an outer race mounted in said groove, an inner race within and spaced from said outer race and anti-friction elements between said races, and sealing rings at the sides of said anti-friction bearing, each sealing ring having a radially outer portion lying against said outer race and within said internal groove of said cage, the width of said internal groove being equal to the width of said outer race plus the thicknesses of the portions of said seals arranged in said internal groove, the radially inner portions of said seals slidably engaging opposite faces of said inner race.

2. A bearing structure comprising a bearing housing having a spherical inner face, a cage within said housing having a spherical outer face engaging the spherical inner face of said housing to rock therein, said housing being provided with diametrically opposite slots extending transversely thereof and having their remote faces spaced apart a distance at least equal to the diameter of said cage, said slots being of a width at least equal to the width of said cage whereby the latter, with its axis perpendicular to the axis of said housing, is adapted to be inserted thereinto, said cage being formed of separable sections and having an internal annular groove, an anti-fraction bearing comprising an outer race mounted in said groove, an inner race within and spaced from said outer race and anti-friction elements between said races, sealing rings at the sides of said anti-friction bearing, each sealing ring having a radially outer portion lying against said outer race and within said internal groove of said cage, the width of said internal groove being equal to the width of said outer race plus the thicknesses of the portions of said seals arranged in said internal groove, the radially inner portions of said seals slidably engaging opposite faces of said inner race, and auxiliary seals within said sealing rings at opposite sides of said anti-friction bearing, said auxiliary seals having their radially outer portions fixed to said outer race and having flat opposed faces slidably engaging adjacent portions of said inner race.

3. A bearing structure comprising a bearing housing having a spherical inner face, a cage within said housing having a spherical outer face engaging the spherical inner face of said housing to rock therein, said housing being provided with diametrically opposite slots extending transversely thereof and having their remote faces spaced apart a distance at least equal to the diameter of said cage, said slots being of a width at least equal to the width of said cage whereby the latter, with its axis perpendicular to the axis of said housing, is adapted to be inserted thereinto, said cage being formed of separable sections and having an internal annular groove, an anti-friction bearing comprising an outer race mounted in said groove, an inner race within and spaced from said outer race and anti-friction elements between said races, and sealing rings at the sides of said anti-friction bearing, each sealing ring having a radially outer portion lying against said outer race and within said internal groove of said cage, the width of said internal groove being equal to the width of said outer race plus the thicknesses of the portions of said seals arranged in said internal groove, said sealing rings diverging radially inwardly relative to said anti-friction bearing and having radially inner portions curving inwardly toward said inner race and terminating in edges engaging opposite faces of said inner race.

4. A bearing structure comprising a bearing housing having a spherical inner face, a cage within said housing having a spherical outer face engaging the spherical inner face of said housing to rock therein, said housing being provided with diametrically opposite slots extending transversely thereof and having their remote faces spaced apart a distance at least equal to the diameter of said cage, said slots being of a width at least equal to the width of said cage whereby the latter, with its axis perpendicular to the axis of said housing, is adapted to be inserted thereinto, said cage being formed of separable sections and having an internal annular groove, an anti-friction bearing comprising an outer race mounted in said groove, an inner race within and spaced from said outer race and anti-friction elements between said races, sealing rings at the sides of said anti-friction bearing, each sealing ring having a radially outer portion lying against said outer race and within said internal groove of said cage, the width of said internal groove being equal to the width of said outer race plus the thicknesses of the portions of said seals arranged in said internal groove, said sealing rings diverging radially inwardly relative to said anti-friction bearing and having radially inner portions curving inwardly toward said inner race and terminating in edges engaging opposite faces of said inner race, and auxiliary seals arranged within said sealing rings at opposite sides of said anti-friction bearing, said auxiliary seals having radially outer portions fixed to said outer race and having flat radially inwardly extending parallel portions slidably engaging opposite portions of said inner race.

5. A bearing structure comprising a housing having an inner spherical face, a cage having a spherical outer face engaging and adapted to rock within said spherical face of said housing, said cage being divided diametrically to form complementary sections, said cage having internal annular parallel flanges defining therebetween an internal groove, an anti-friction bearing comprising inner and outer races and anti-friction elements therebetween, said outer race having its radially outer portion arranged in said internal groove, sealing rings at opposite sides of said anti-friction bearing, said sealing rings having radially outer portions arranged in said internal groove between said outer race and said internal flanges and fitting thereagainst, said sealing rings diverging radially inwardly and having radially inner portions curved toward each other and terminating in edges slidably engaging opposite faces of said inner race, and auxiliary seals arranged within said sealing rings at opposite sides of said anti-friction bearing, opposite faces of said outer race having annular grooves and said auxiliary seals having flanges tightly fitting such annular grooves to be retained in position by said outer race, said auxiliary seals having radially inner surface portions slidably engaging adjacent portions of said inner race.

References Cited in the file of this patent

UNITED STATES PATENTS

| | | |
|---|---|---|
| 1,844,552 | Bailey | Feb. 9, 1932 |
| 2,151,730 | Basebe et al. | Mar. 28, 1939 |
| 2,572,411 | Watt | Oct. 23, 1951 |

FOREIGN PATENTS

| | | |
|---|---|---|
| 139,208 | Great Britain | May 20, 1927 |
| 554,981 | Great Britain | July 28, 1943 |
| 640,917 | Great Britain | Aug. 2, 1950 |